US008371341B2

(12) United States Patent
Gray

(10) Patent No.: US 8,371,341 B2
(45) Date of Patent: Feb. 12, 2013

(54) MAGNETICALLY ACTUATED VAPOR RECOVERY VALVE

(75) Inventor: John M. Gray, Cincinnati, OH (US)

(73) Assignee: Deleware Capital Formation, Inc., Wilmington, DE (US)

( * ) Notice: Subject to any disclaimer, the term of this patent is extended or adjusted under 35 U.S.C. 154(b) by 669 days.

(21) Appl. No.: 12/566,059

(22) Filed: Sep. 24, 2009

(65) Prior Publication Data

US 2011/0067779 A1 Mar. 24, 2011

(51) Int. Cl.
*B65B 31/04* (2006.01)
*F16K 31/02* (2006.01)

(52) U.S. Cl. .................. 141/59; 141/7; 141/65; 141/66

(58) Field of Classification Search ................ 141/7, 46, 141/59, 65, 66; 251/129.01
See application file for complete search history.

(56) References Cited

U.S. PATENT DOCUMENTS

| | | | |
|---|---|---|---|
| 3,495,620 | A | 2/1970 | Raimondi et al. |
| 3,999,936 | A | 12/1976 | Hasselmann |
| 4,020,861 | A | 5/1977 | Shihabi |
| 4,056,131 | A | 11/1977 | Healy |
| 4,057,085 | A | 11/1977 | Shihabi |
| 4,057,086 | A | 11/1977 | Healy |
| 4,060,110 | A | 11/1977 | Bower |
| 4,253,503 | A | 3/1981 | Gunn |
| 4,295,504 | A | 10/1981 | Hasselman |
| 4,295,505 | A | 10/1981 | Hasselmann et al. |
| 4,649,970 | A | 3/1987 | Bower et al. |
| 4,792,113 | A | 12/1988 | Eidsmore |
| 4,874,012 | A | 10/1989 | Velie |
| 5,020,861 | A | 6/1991 | Gorges |

(Continued)

FOREIGN PATENT DOCUMENTS

| | | |
|---|---|---|
| AU | 2009213108 | 4/2010 |
| CN | 100408657 | 8/2008 |

(Continued)

OTHER PUBLICATIONS

PCT, Invitation to Pay Additional Fees and Partial International Search Report, International Application No. PCT/US2010/049760 (Dec. 20, 2010).

(Continued)

*Primary Examiner* — Timothy L Maust
*Assistant Examiner* — Robert Bell, III
(74) *Attorney, Agent, or Firm* — Thompson Hine L.L.P.

(57) ABSTRACT

A system including a vapor recovery valve having a valve body with a fluid flow path and a vapor flow path. The fluid flow path and the vapor flow path are generally fluidly isolated from each other. The vapor recovery valve further includes a vapor control valve positioned in the vapor flow path. The vapor control valve is movable between a first position wherein the vapor control valve at least partially impedes the flow of vapor therethrough and a second position wherein the vapor control valve does not impede or less impedes the flow of vapor therethrough compared to when the vapor control valve is in the first position. The vapor recover valve includes an actuator magnetically coupled to the vapor control valve. The actuator is configured such that sufficient fluid flow through the fluid flow path in a first direction causes the actuator to move the vapor control valve from the first position to the second position in a second direction that is generally not the same as the first direction.

24 Claims, 9 Drawing Sheets

U.S. PATENT DOCUMENTS

| | | | |
|---|---|---|---|
| 5,217,051 | A | 6/1993 | Simpson et al. |
| 5,280,814 | A | 1/1994 | Stroh |
| 5,327,944 | A | 7/1994 | Healy |
| 5,345,979 | A | 9/1994 | Tucker et al. |
| 5,417,259 | A * | 5/1995 | Schneider ........................ 141/59 |
| 5,435,356 | A | 7/1995 | Rabinovich |
| 5,484,000 | A | 1/1996 | Hasselmann |
| 5,592,979 | A | 1/1997 | Payne et al. |
| 5,676,181 | A | 10/1997 | Healy |
| 5,720,325 | A | 2/1998 | Grantham |
| 5,765,603 | A | 6/1998 | Healy |
| 6,095,204 | A | 8/2000 | Healy |
| 6,174,351 | B1 | 1/2001 | McDowell et al. |
| 6,334,470 | B2 | 1/2002 | Healy |
| 6,360,785 | B1 | 3/2002 | Healy |
| 6,769,460 | B2 | 8/2004 | Persson |
| 6,923,221 | B2 | 8/2005 | Riffle |
| 6,941,978 | B2 | 9/2005 | Riffle |
| 7,506,663 | B2 | 3/2009 | Thomas et al. |

FOREIGN PATENT DOCUMENTS

| | | |
|---|---|---|
| CN | 101450780 | 6/2009 |
| DE | 4028571 | 2/1992 |
| DE | 4120618 | 12/1992 |
| DE | 4431547 | 10/1995 |
| DE | 19719806 | 1/1998 |
| EP | 0461770 | 12/1991 |
| EP | 0586480 | 3/1994 |
| EP | 0598928 | 6/1994 |
| EP | 0703186 | 3/1996 |
| EP | 0799790 | 10/1997 |
| EP | 1103516 | 5/2001 |
| EP | 1327604 | 7/2003 |
| EP | 0888236 | 11/2003 |
| EP | 1398295 | 3/2004 |
| EP | 2096080 | 9/2009 |
| EP | 2163513 | 3/2010 |
| FR | 2748465 | 11/1997 |
| FR | 2753961 | 4/1998 |
| FR | 2924706 | 6/2009 |
| GB | 2311768 | 10/1997 |
| GB | 2313825 | 12/1997 |
| GB | 2316060 | 2/1998 |
| IT | MI962244 | 4/1998 |
| SE | 9904304 | 5/2001 |
| SE | 516834 | 3/2002 |
| SE | 523480 | 4/2004 |
| WO | 02/16253 | 2/2002 |
| WO | 2004/081433 | 9/2004 |
| WO | 2004/092307 | 10/2004 |

OTHER PUBLICATIONS

PCT, International Search Report and Written Opinion, International Application No. PCT/US2010/049760 (Feb. 22, 2011).

Machine generated English translation of EP 0703186 (published Mar. 27, 1996).

"Transportation Products Catalog," 51 pages, AMETEK Technical and Industrial Products, Kent, Ohio, http://www.ametektip.com/index.php?option=com_content&view=article&id=, (2005).

Product literature, "ROTRON® Regenerative Blowers—EN 404M & CP 404M Sealed Regenerative Blower w/Explosion-Proof Motor," 2 pages, AMETEK Technical and Industrial Products, Kent, Ohio (Feb. 2004).

Product literature, "ROTRON® Regenerative Blowers—RD Remote Drive (Motorless) Blowers," 2 pages, AMETEK Technical and Industrial Products, Kent, Ohio (Jun. 2008).

Product literature, "Gast Regenair® Regenerative Blowers," 2 pages, Gast Manufacturing Inc., Benton Harbor, Michigan (2001).

Product literature, "Engineered With Your Customers in Mind—MRV3 Mechanical Regulatory Valve," 2 pages, OPW Fueling Components Europe, The Netherlands (Sep. 9, 2004).

* cited by examiner

MAGNETICALLY ACTUATED VAPOR RECOVERY VALVE

The present invention is directed to a vapor recovery valve, more particularly, to a magnetically actuated vapor recovery valve.

BACKGROUND

At a typical refueling station or other refueling system, fuel is pumped from a storage tank to a vehicle fuel tank via a fuel dispenser. As the fuel enters the vehicle fuel tank, vapors from inside the vehicle tank are exhausted or forced out of the vehicle. Environmental laws and/or regulations typically require that the emitted vapors be captured. For example, stage II vacuum assist vapor recovery systems (i.e. vapor recovery systems utilized during vehicle refueling) may be required to capture/recover a certain percentage (such as 95%) of the vapor that is exhausted from the vehicle tank during refueling. The captured vapor is typically returned to the ullage space of the storage tank.

Vacuum assist vapor recovery system may utilize a vacuum source to aid in capturing the exhausted vapors. In some cases, the applied vacuum is regulated to vary in proportion to the rate of flow of dispensed fuel. However, many existing proportional vapor recovery valves provide insufficient internal sealing and ineffective proportional control.

SUMMARY

Accordingly, in one embodiment the present invention is a vapor recovery valve which provides an improved seal arrangement and more precise proportional control. In one embodiment the vapor recovery valve is magnetically actuated. More particularly, in one embodiment, the invention is a system including a vapor recovery valve having a valve body with a fluid flow path and a vapor flow path. The fluid flow path and the vapor flow path are generally fluidly isolated from each other. The vapor recovery valve further includes a vapor control valve positioned in the vapor flow path. The vapor control valve is movable between a first position wherein the vapor control valve at least partially impedes the flow of vapor therethrough and a second position wherein the vapor control valve does not impede or less impedes the flow of vapor therethrough compared to when the vapor control valve is in the first position. The vapor recover valve includes an actuator magnetically coupled to the vapor control valve. The actuator is configured such that sufficient fluid flow through the fluid flow path in a first direction causes the actuator to move the vapor control valve from the first position to the second position in a second direction that is generally not the same as the first direction.

DETAILED DESCRIPTION

Figures 1, 1A:
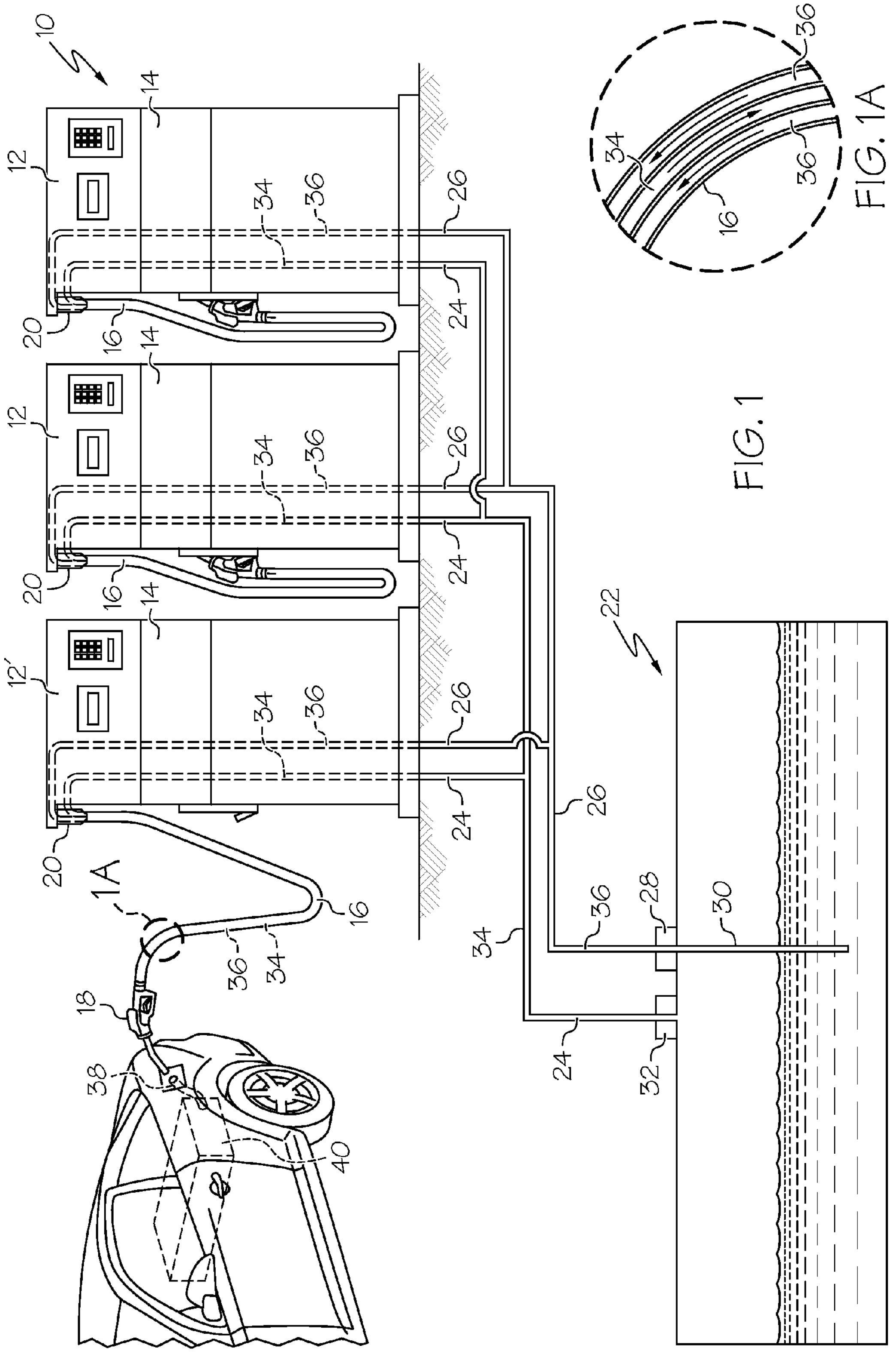
FIG. 1 is a schematic representation of a refilling system utilizing a plurality of dispensers.
FIG. 1A is a detail section of the area indicated in FIG. 1.

FIG. 1 is a schematic representation of a refilling system 10 including a plurality of dispensers 12. Each dispenser 12 includes a dispenser body 14, a hose 16 coupled to the dispenser body 14, and a nozzle 18 positioned at the distal end of the hose 16. Each dispenser 12 may include a vapor recovery valve 20 generally positioned between the hose 16 and the dispenser body 14. Each hose 16 may be generally flexible and pliable to allow the hose 16 and nozzle 18 to be positioned in a convenient refilling position as desired by the operator.

Each dispenser 12 is in fluid communication with a fuel/fluid storage tank 22. For example, a fluid conduit 26 extends from each vapor control valve 20 to the storage tank 22, and a vapor conduit 24 extends from each vapor control valve 20 to the storage tank 22. FIG. 1 provides a schematic representation of the connections between the vapor control valves 20, vapor conduits 24, fluid conduits 26 and the fuel storage tank 22. However, it should be understood that the vapor control valve 20, vapor conduit 24, fluid conduit 26 and storage tank 22 can include any of a wide variety of configurations, couplings and arrangements as known in the art.

The storage tank 22 includes or is coupled to a fuel pump 28 which is configured to draw fluid out of the storage tank 22 via a pipe 30. The storage tank 22 further includes or is coupled to a vapor pump, vacuum pump, vacuum source or suction source 32 in fluid communication with the vapor conduits 24 and ullage space of the storage tank 22.

Each dispenser 12 includes a vapor path, vapor flow path or vapor recovery path 34 extending from the nozzle 18, through the hose 16, the vapor control valve 20 and vapor conduit 24 to the vapor pump 32 and ullage space of the tank 22. Similarly, each dispenser 12 includes a fuel or fluid flow path 36 extending from the nozzle 18, through the hose 16, the vapor control valve 20 and the fluid conduit 26 to the fuel pump 28/storage tank 22. The vapor flow path 34 and fluid flow path 36 may be generally functionally and/or geometrically parallel but fluidly isolated from each other.

For example, as shown in FIG. 1A, in one embodiment the vapor flow path 34 of the hose 16 is received within, and generally coaxial with, the fluid flow path 36 of the hose 16. However, this configuration may be reversed such that the fluid flow path 36 is received within the vapor flow path 34, or other configurations (i.e., side-by-side or the like) may be utilized. Moreover, as can be seen in FIG. 1 the vapor flow path 34 and fluid flow path 36 may directionally diverge at the dispensers 12 or other places in the system 10. The vapor conduit 24 and fluie conduit 26 can also be arranged in a generally concentric manner if desired.

During refilling, as shown by the in-use dispenser 12' of FIG. 1, the nozzle 18 is inserted into a fill pipe 38 of a vehicle fuel tank 40. The fuel pump 28 is activated to pump fuel from the storage tank 22 to the nozzle 18 and into the vehicle fuel tank 40. The vacuum pump 32 may also be activated at that time to recover vapors. As fuel enters the vehicle fuel tank 40, vapors from inside the fuel tank 40 are exhausted or forced out of the fuel tank 40, and captured or routed into the vapor flow path 34. The vapor pump 32 provides a suction force to the vapor flow path 34 to aid in capturing vapors and routing them to the ullage space of the storage tank 22.

In the embodiment illustrated in FIG. 1, each dispenser 12 is fluidly coupled to a single fuel pump 28, vapor pump 32 and storage tank 22. For example, in the illustrated embodiment, three dispensers 12 share a single vapor pump 32, fuel pump 28 and/or storage tank 22. However, it should be understood any of a number of dispensers 12, including more or less than three, may share a vapor pump 32, fuel pump 28 and/or storage tank 22. In addition, if desired, each dispenser 12 may have its own dedicated vapor pump 32, fuel pump 28 and/or storage tank 22. Moreover, each vapor pump 32 and fuel pump 28 need not necessarily be located at the associated storage tank 22. For example, the vapor pump 32 and/or fuel pump 28 can instead be positioned at each associated dispenser 12 in a so-called "suction" system, instead of the so-called "pressure system" shown in FIG. 1, or be at other positions as desired.

In the illustrated embodiment, the nozzle 18 is positioned at a distal end of the hose 16, and the vapor recovery valve 20 is positioned at the opposite end of the hose 16 adjacent to the dispenser body 14. In this position, the vapor recovery valve 20 is positioned relatively high and away from the nozzle 18, close to the dispenser body 14, which helps to protect the vapor recovery valve 20 from wear and tear that can result from the vapor recovery valve 20 impacting a vehicle, the dispenser body 14 or the like. However, it should be understood that the vapor recovery valve 20 can be positioned at nearly any position along the fluid flow path 36/vapor flow path 34. The system 10 can be used to dispense any of a wide variety of fluids or fuels, including but not limited to petroleum-based fuels, such as gasoline, diesel, natural gas, biofuels, propane, oil, or ethanol or the like.

Figure 2:
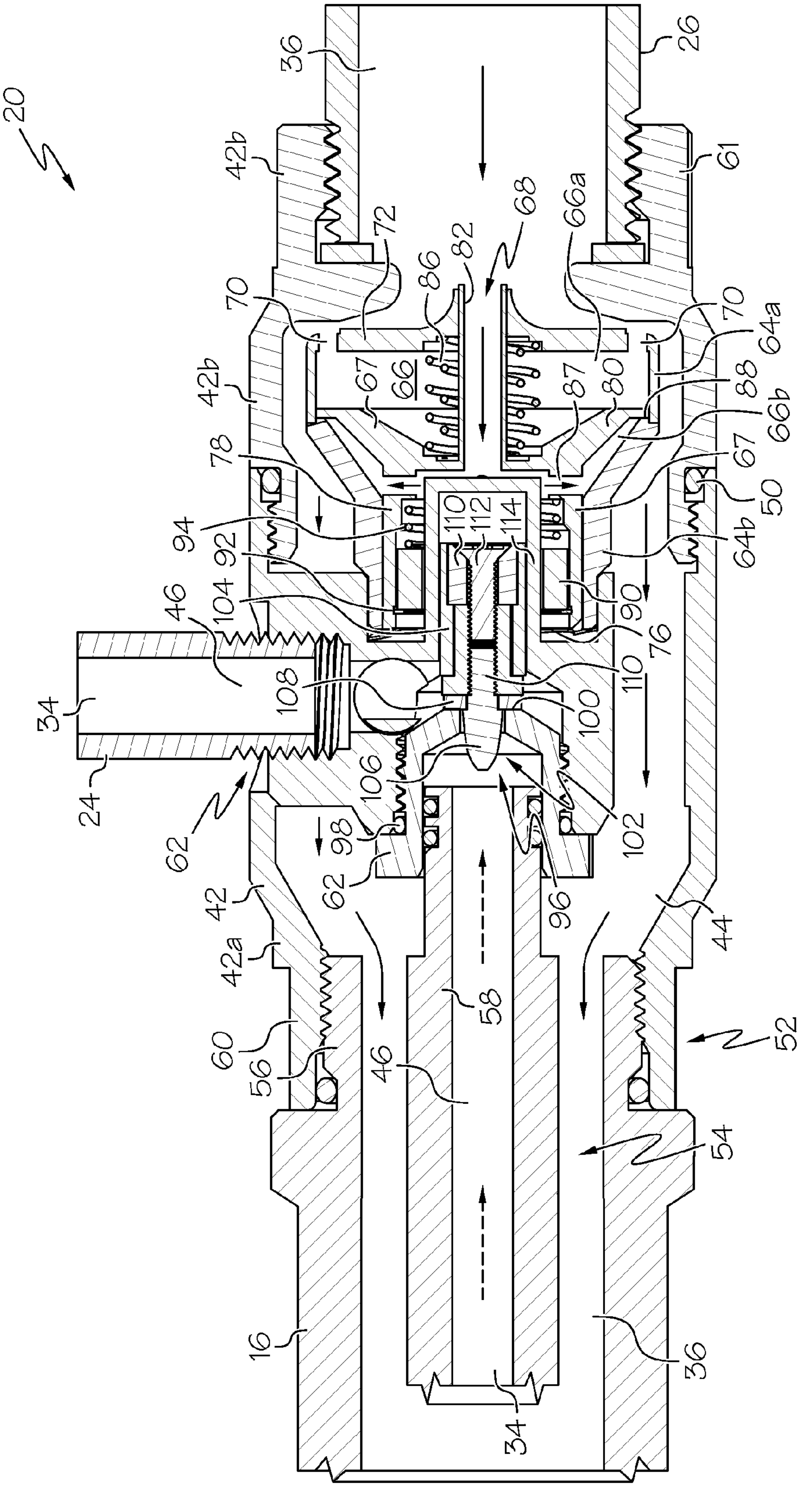
FIG. 2 is a side cross section of a vapor recovery valve of the system of FIG. 1 shown in conjunction with part of the hose, fluid conduit and vapor conduit of FIG. 1, with the vapor control valve in its closed position.
Figure 3:
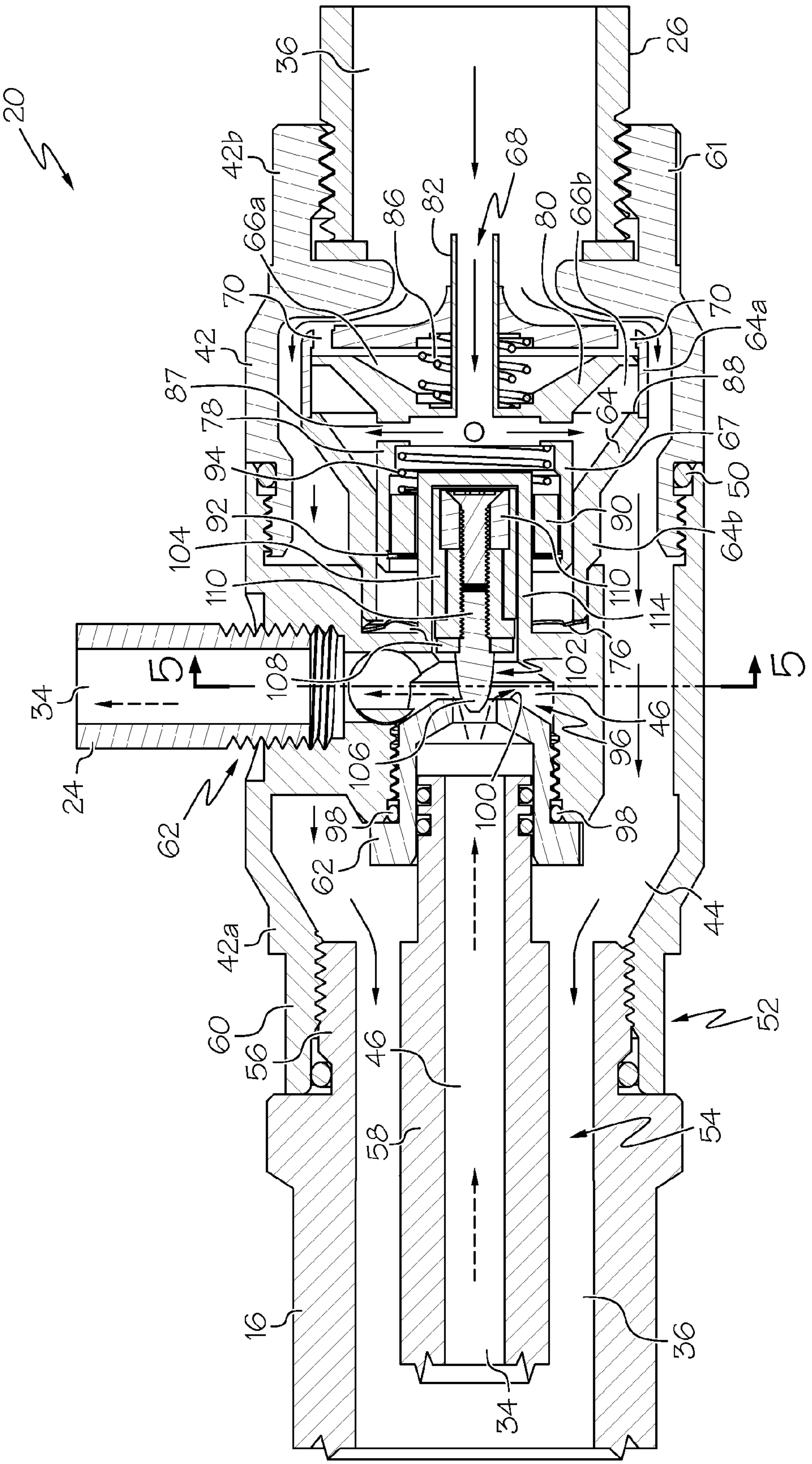
FIG. 3 is a side cross section of the vapor recovery valve and components of FIG. 2, with the vapor control valve in its open position.
Figure 4:
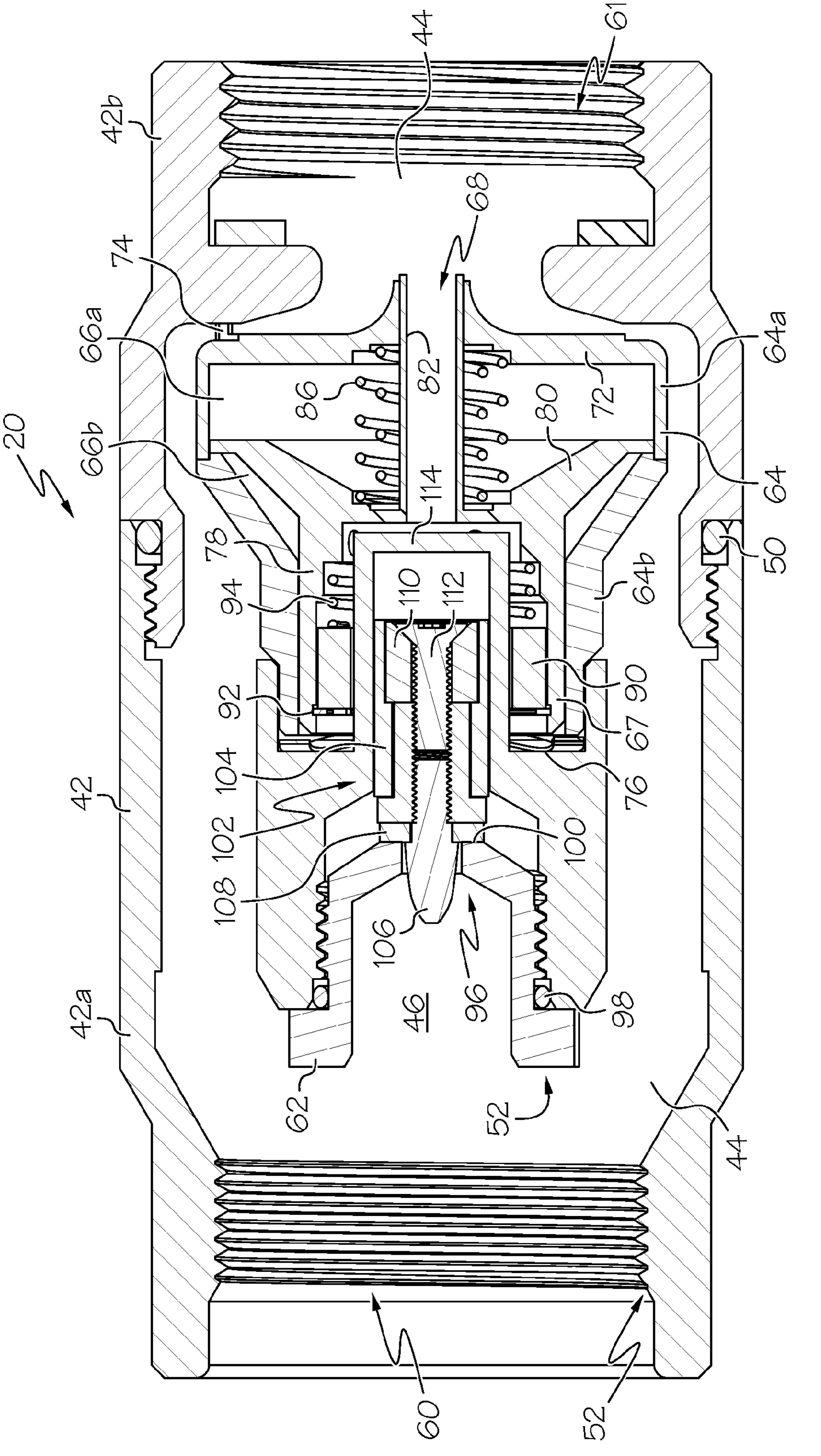
FIG. 4 is a side cross section of the vapor control valve of FIG. 2, taken at a view rotated 90° about the central axis thereof.

As best shown in FIGS. 2-4, in one embodiment the vapor recovery valve 20 includes a valve body 42 having a fluid flow path 44 and a vapor flow path 46 therein, which can be considered part of the fluid flow path 36 and vapor flow path 34, respectively, of the system 10. The fluid flow path 44 and vapor flow path 46 of the vapor recovery valve 20 are both generally fluidly isolated from each other. In the illustrated embodiment, the valve body 42 is generally annular and includes first **42*a* and second 42*b* portions threadably coupled together with an O-ring or the like 50 positioned therebetween. However, the valve body 42** can be made of a single unitary seamless piece, or more than two pieces, if desired.

The vapor recovery valve 20 may include a hose coupling connection 52 at one end thereof which mechanically and fluidly couples the vapor recovery valve 20 to the hose 16 or its coupling 54. In particular, the hose coupling 54 may include a male threaded component 56 and an inner protruding nipple 58. The male threaded component 56 is threadably received in a female threaded end portion 60 of the valve body 42, and the nipple 58 is slidably received in a seat body 62 of the vapor recovery valve 20. In this manner, the fluid flow path 36 of the hose 16 is in fluid communication with the fluid flow path 44 of the vapor recovery valve 20, and the vapor flow path 34 of the hose 16 is in fluid communication with the vapor flow path 46 of the vapor recovery valve 20.

The vapor control valve 20 also includes a fluid conduit connection 61 mechanically and fluidly coupled (i.e., threadably coupled in the illustrated embodiment) to the fluid conduit 26. Fluid entering the fluid flow path 44 of the vapor control valve 20 flows from the fluid conduit 26 to the hose 16 in the direction of the solid-line arrows shown in FIGS. 2 and 3. The vapor control valve 20 also includes a vapor conduit connection 62 mechanically and fluidly coupled (i.e., threadably coupled in the illustrated embodiment) to the vapor conduit 24. Vapors entering the vapor flow path 46 of the vapor control valve 20 typically enter in the axial direction from the hose 16, and exit radially along to the vapor conduit 24, in the direction of the dotted line arrows shown in FIG. 3.

Figure 7:
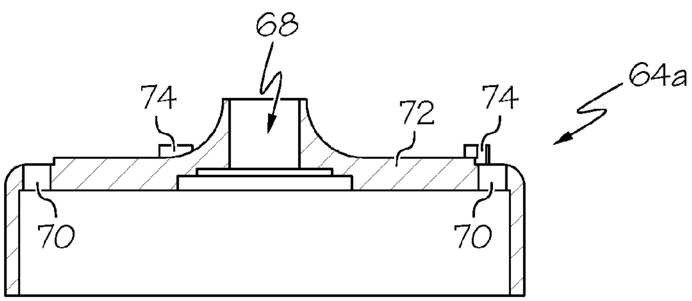
FIG. 7 is a side cross section of the upper cylinder portion of the vapor recovery valve of FIG. 2.
Figure 8:
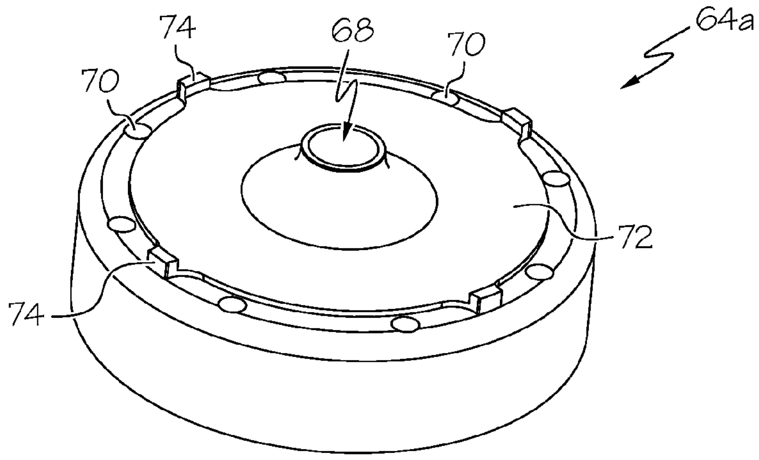
FIG. 8 is a top perspective view of the upper cylinder portion of FIG. 7.
Figure 9:
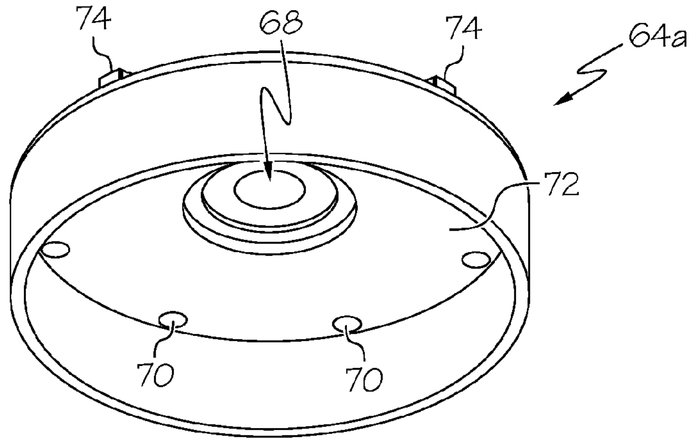
FIG. 9 is a bottom perspective view of the upper cylinder portion of FIG. 7.

The vapor recovery valve 20 includes a cylinder 64 receiving an actuator 67 therein. The cylinder 64 includes an upper cylinder portion **64*a* and a lower cylinder portion 64*b* (see FIGS. 7-9) although it should be understood that the terms "top," "up," "upper," "bottom," "lower," "below," and other indications of directionality, are used in conjunction with the particular configuration shown in FIG. 1, and the vapor recovery valve 20 can be used in any of a variety of orientations. The upper 64*a* and lower 64*b* cylinder portions are mechanically and fixedly coupled together to form the cylinder 64 having an inner chamber 66 defined therein. As can be seen in FIGS. 7-9, the upper cylinder portion 64*a* is generally cup-shaped and includes a central opening 68 formed therethrough. A plurality of outer openings 70 are circumferentially spaced about the outer edge of the end face 72 of the upper cylinder portion 64*a*. The upper cylinder portion 64*a* also includes a plurality of spacers 74 extending forwardly from the end face 72. As shown in FIGS. 2-4, a wave washer 76 is positioned between the valve body 42 and the cylinder 64 to bias the cylinder upwardly and take up any tolerances in the valve body 42/cylinder 64. The spacers 74 on the top of the upper cylinder portion 64*a* engage the valve body 42 (see FIG. 4) to prevent the upper cylinder portion 64*a* from bottoming out on the valve body 42, which would hinder the flow of fluid through the fluid flow path 44**.

Figure 10:
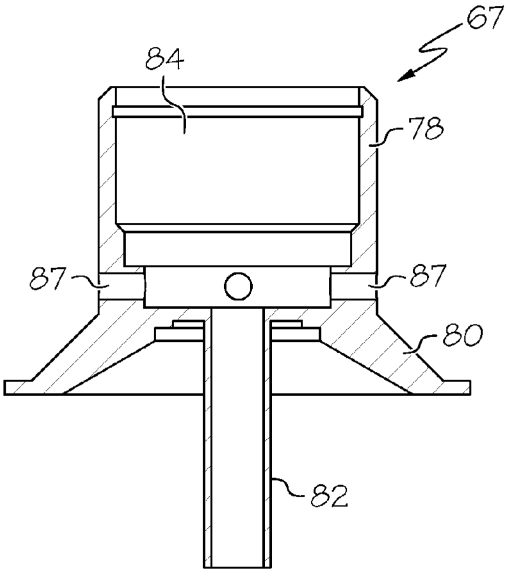
FIG. 10 is a side cross section of the actuator of the vapor recovery valve of FIG. 2.
Figure 11:
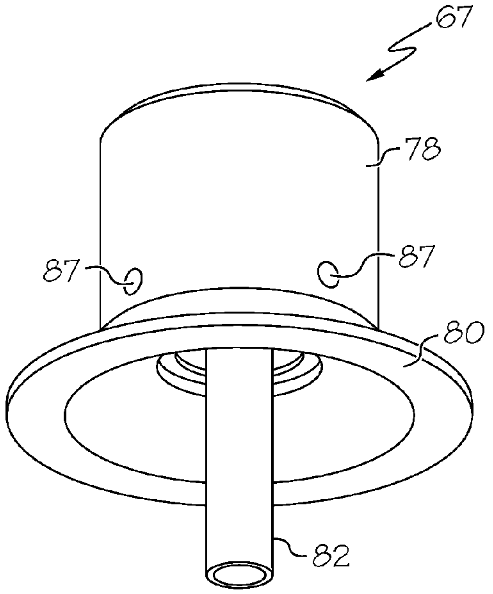
FIG. 11 is a bottom perspective view of the actuator of FIG. 10.
Figure 12:
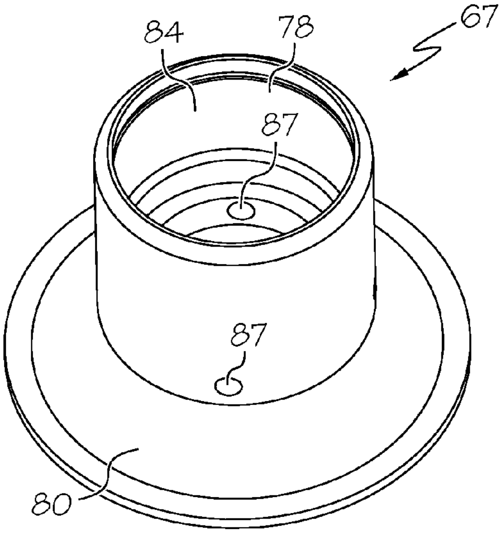
FIG. 12 is a top perspective view of the actuator of FIG. 10.

As shown in FIGS. 10-12, the actuator 67 includes a generally cylindrical head 78, a generally radially-extending skirt or diaphragm 80 extending from the lower portion of the head 78, and a central, cylindrical guide sleeve 82 extending away from the head 78 and the diaphragm 80. The guide sleeve 82 is hollow and is in fluid communication with a central opening 84 of the cylindrical head 78. The cylindrical head 78 includes a plurality of radially extending outer openings 87 circumferentially spaced about the cylindrical head 78. Each outer opening 87 extends through the walls of the cylindrical head 78 and into the central opening 84.

As can be seen in FIGS. 2-4, the actuator 67 is received in the chamber 66 of the cylinder 64 such that the diaphragm 80 of the actuator 67 divides the chamber 66 into an upper cavity **66*a* and a lower cavity 66*b*. The guide sleeve 82 of the actuator 67 extends through the central opening 68 of the upper cylinder portion 64*a*. A compression spring 86 is positioned in the chamber 66 and about the guide sleeve 82 of the actuator 67 to spring bias the actuator 67 to its lower/closed position as shown in FIGS. 2 and 4. The diaphragm 80 of the actuator 67 engages a lip 88 of the lower cylinder portion 64*b* to prevent further downward movement of the actuator 67. In the illustrated embodiment, two springs 86 are utilized to bias the actuator 67 to its closed position in order to adjust the spring biasing force in the desired manner (i.e. providing a relatively low spring force at small displacements but relatively large spring force at higher displacements). However, it should be understood that only a single spring 86, or more than two springs 86**, or various other forms of springs, can be used as desired.

The actuator 67 includes or is coupled to an actuator magnet 90 such that any axial movement of the actuator 67 causes corresponding axial movement of the actuator magnet 90. In the illustrated embodiment, the actuator magnet 90 is received at or adjacent to a lower end of the cylindrical head 78 of the actuator 67. The actuator magnet 90 is trapped between a retainer ring 92 and a magnet spring 94 which urges the actuator magnet 90 downwardly against the retainer ring 92 to trap the actuator magnet 90 in place and take up any tolerances.

The vapor recovery valve 20 includes a vapor control valve, generally designated 96, positioned in the valve body 42. The vapor control valve 96 includes the seat body 62 threaded into the valve body 42 with an O-ring 98 or the like positioned therebetween. As noted above, the seat body 62 is configured to slidingly receive the nipple 58 of the hose coupling 54 therein, but may also provide a seat 100 for the vapor control valve 96 on the opposite side thereof.

The vapor control valve 96 includes a movable portion 102 including a guide 104, a valve head 106, and a seal 108 positioned between the guide 104 and the valve head 106. In the illustrated embodiment, the valve head 106 includes a stem 110 threadably received in the guide 104. The valve head 106 may have a generally parabolical profile or a "bullet"-shape tip, as will be described in greater detail below.

The vapor control valve 96/movable portion 102 includes or is coupled to a valve magnet 110. In particular, in the illustrated embodiment, a threaded fastener 112, such as a screw or the like, extends through the valve magnet 110 and is threadably received in the guide 104 to couple the valve magnet 110 to the movable portion 102, although the valve magnet 110 can be coupled to the movable portion 102 in any of a wide variety of manners.

The vapor control valve 96 is positioned in the vapor flow path 46 and is movable between a first or generally closed position or state (FIGS. 2 and 4) wherein seal 108 and/or valve head 106 engages, or is in close proximity to, the seat 100/seat body 62 such that the vapor control valve 96 generally, or at least partially, impedes the flow of vapor therethrough. The vapor control valve 96 is also movable to a second or generally open position or state (FIG. 3) wherein the seal 108/valve head 106 is spaced away from the seat 100/seat body 62 such that vapor control valve 96 does not impede, or less impedes, the flow of vapor therethrough compared to when the vapor control valve 96 is in the closed position.

The vapor recovery valve 20 includes a generally annular seal portion 114 which fluidly isolates the vapor control valve 96/vapor flow path 46 from the actuator 67/fluid flow path 36. The guide 104 is also closely received in the seal portion 114 such that the seal portion 114 guides sliding movement of the movable portion 102. In the illustrated embodiment, the seal portion 114 is unitary, or formed as one piece, with the valve body 42 to provide a sealed and seamless seal portion 114. However, if desired, the seal portion 114 can be made of one or more components joined together. It may be desired that the seal portion 114 be made of a magnetically transparent material, or of a material having a low magnetic profile, so that the valve magnet 110 and actuator magnet 90 can magnetically interact across the seal portion 114. Thus, the valve body 42, and in particular the seal portion 114, can be made of, for example, aluminum, plastics, polymers, composites or the like.

When the associated dispenser 12 is not dispensing fluid/recovery vapor, the vapor control valve 96 may reside in its closed position, as shown in FIGS. 2 and 4, wherein the seal 108 of the vapor control valve 96 sealingly engages the seat 100 and prevents vapor from flowing to, or away from, the storage tank 22. In particular, the actuator 67 is urged to its lower/closed position by the spring 86. Magnetic interaction between the actuator magnet 90 and the valve magnet 110 causes the vapor control valve 96 to reside in its closed position.

During operation of an associated dispenser 12, fluid flows into the fluid flow path 44 of the vapor recovery valve 20 from the fuel conduit 26. As shown in FIG. 2, part of the entering fluid flows axially and enters the guide sleeve 82 of the actuator 67, and part of the fluid is diverted radially and flows about the upper cylinder portion 64*a*. The fluid entering the guide sleeve 82 enters the central opening 84 of the cylindrical head, and also flows radially outwardly through the outer openings 87 of the cylindrical head, filling the lower cavity 66*b*. In this manner, the lower cavity 66*b* is filled with a relatively high pressure fluid at a pressure representing the stagnation pressure of incoming fluid flow.

Simultaneously, fluid flowing radially outwardly flows past the upwardly-facing outer openings 70 of the upper cylinder portion 64*a*. In this manner, the radial fluid flow creates a low pressure in the upper cavity 66*a* due to venturi force of fluid flowing past the outer openings 70. The fluid then continues downstream and enters the hose 16 for dispensing into a vehicle fuel tank 40 or the like.

When sufficient fluid is flowing through the fluid flow path 44, the differential pressure across the diaphragm 80 causes the diaphragm 80 and actuator 67 to move upwardly, or in the opposite direction to the flow of fluid through the vapor recovery valve 20 (i.e., the direction fluid flows when it first enters the vapor recovery valve 20, or exits the vapor recovery valve 20, or the general direction of fluid flow from the entrance to the exit of the vapor recovery valve 20). Thus, the actuator 67 moves in a direction that is generally not the same as the direction of fluid flow.

Movement of the actuator 67 in the upward direction causes the actuator magnet 90 to be correspondingly moved upwardly. Because the valve magnet 110 is magnetically coupled to the actuator magnet 90, the valve magnet 110 is also pulled upwardly which causes the valve head 106 and seal 108 to move away from the seat body 62/seat 100, thereby slightly opening the vapor control valve 96. Opening of the vapor control valve 96 allows vapor (displaced by the dispensed fluid and/or pulled by the vapor pump 32) to pass through the vapor flow path 46 of the vapor recovery valve 20 and into the associated vapor conduit 24 and ultimately ullage space of the storage tank 22. Sustained sufficient fluid flow through the fluid flow path 44 causes the vapor control valve 96 to be maintained in this position.

Increased fluid flow, or increased rate of fluid flow, through the vapor recovery valve 20 causes increased opening of the vapor control valve 96. In particular, increased fluid flow increases the pressure in the lower cavity 66*b* and decreases pressure in the upper cavity 66*a*, thereby causing further upward movement of the actuator 67. This upper movement of the actuator 67, in turn, causes further opening of the vapor control valve 96 to allow greater recovery of, or rate of recovery of, vapor through the vapor flow path 46. In this manner, the vapor recovery valve 20 provides proportional control such that the recovery of vapor is proportional to the flow of fluid through the fluid flow path 36/44. Since the exhaust of vapors out of a vehicle tank 40 is proportional to the rate of fluid being dispensed therein, it can be seen that the proportional control of the vapor recovery valve 20 effectively addresses the need for such increased vapor recovery.

Once the fluid flow through the fluid flow path 36/44 ceases, or has dropped to a sufficiently low level, the actuator 67 returns to its lower or closed position, as biased by the spring 86. Movement of the actuator 67 to its closed position moves the actuator magnet 90 which, in turn, magnetically interacts with the valve magnet 110 to return the vapor control valve 96 to its closed position. In this manner, the vapor control valve 96 returns to its closed position, ultimately due to the biasing force of the spring 86. Thus, the vapor control valve 96 is configured to return to its closed position due to a force other than the force of gravity. In this manner, the vapor control valve 96 can be automatically returned to its closed position, or be biased to return to its closed position, in a predictable manner regardless of the orientation of the nozzle 18, vapor recovery valve 20 or vapor control valve 96.

The magnetic coupling between the actuator 67 and the vapor control valve 96 allows the actuator 67 to control movement of the vapor control valve 96 while remaining fluidly isolated from the vapor control valve 96 via the seal portion 114. In this manner, the seal portion 114 provides fluid isolation between the fluid flow path 44 and vapor flow path 46, thereby eliminating the need for any seals across the seal portion 114. Fluid isolation due to magnetic actuation also decreases any frictional forces which may otherwise be imposed due to seals which seek to seal a breach between the vapor flow path 46 and fluid flow path 44. Thus, the seal portion 114 can provide a generally continuous structure which generally lacks any openings formed therethrough or any slidable or movable portions extending therethrough.

It should be understood that the actuator magnet 90 and valve magnet 110 can be made of any of a wide variety of materials, including permanently magnetized materials. However, it should be also understood that only one of the magnets 90, 110 may be made of a permanently magnetized material, and the other of the "magnets" 90, 110 can be made of or include a magnetizable material such as ferrous metals or the like which still provides the desired magnetic interaction.

The head 106 of the movable portion 102 of the vapor control valve 96 can be specifically shaped and configured to provide proportional control. In particular, the head 106 may have a shape or curvature such that the opened surface area in the vapor control valve 96 increases in the desired manner as the movable portion 102 is moved. In other words, the cross sectional area of the opening of the vapor control valve 96 has a predefined relationship with movement of the movable portion 102. In addition, the movable portion 102 may have a relatively wide range of axial movement (i.e., between about 4 mm and 10 mm in one embodiment). In this case, with a relatively wide range of movement, more precise control can be provided since small movements of the movable portion 102 do not necessarily cause a large change in the opening of the vapor control valve 96.

Figure 5:
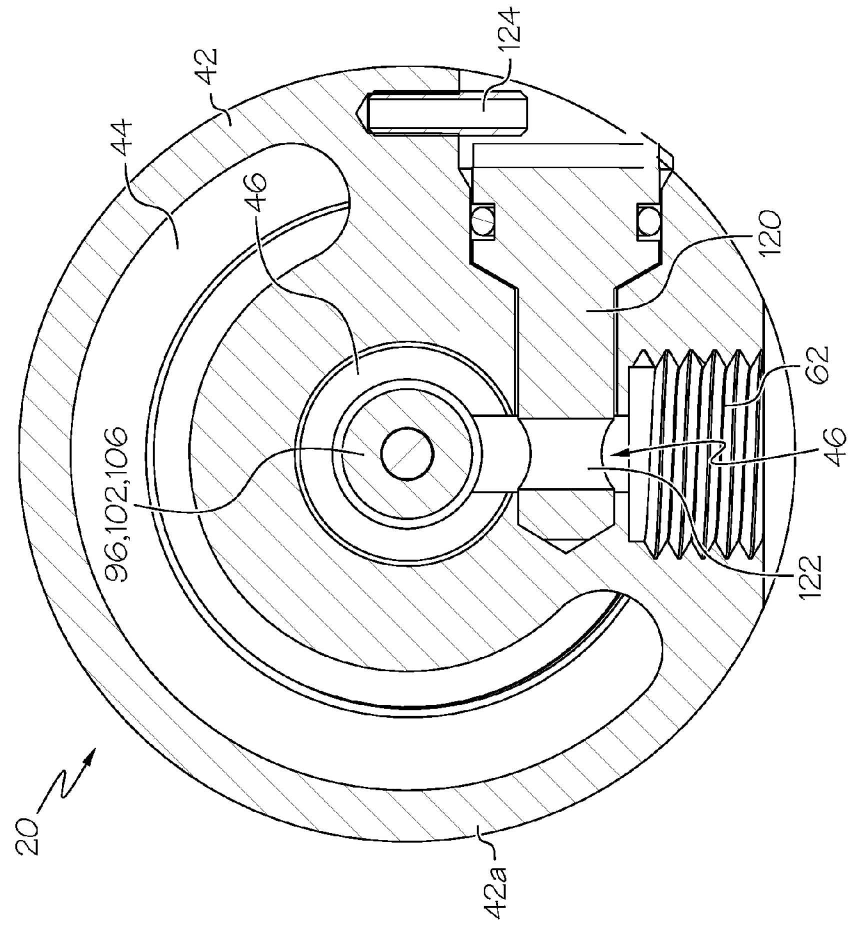
FIG. 5 is an end cross section of the vapor control valve taken along line 5-5 of FIG. 3.
Figure 6:
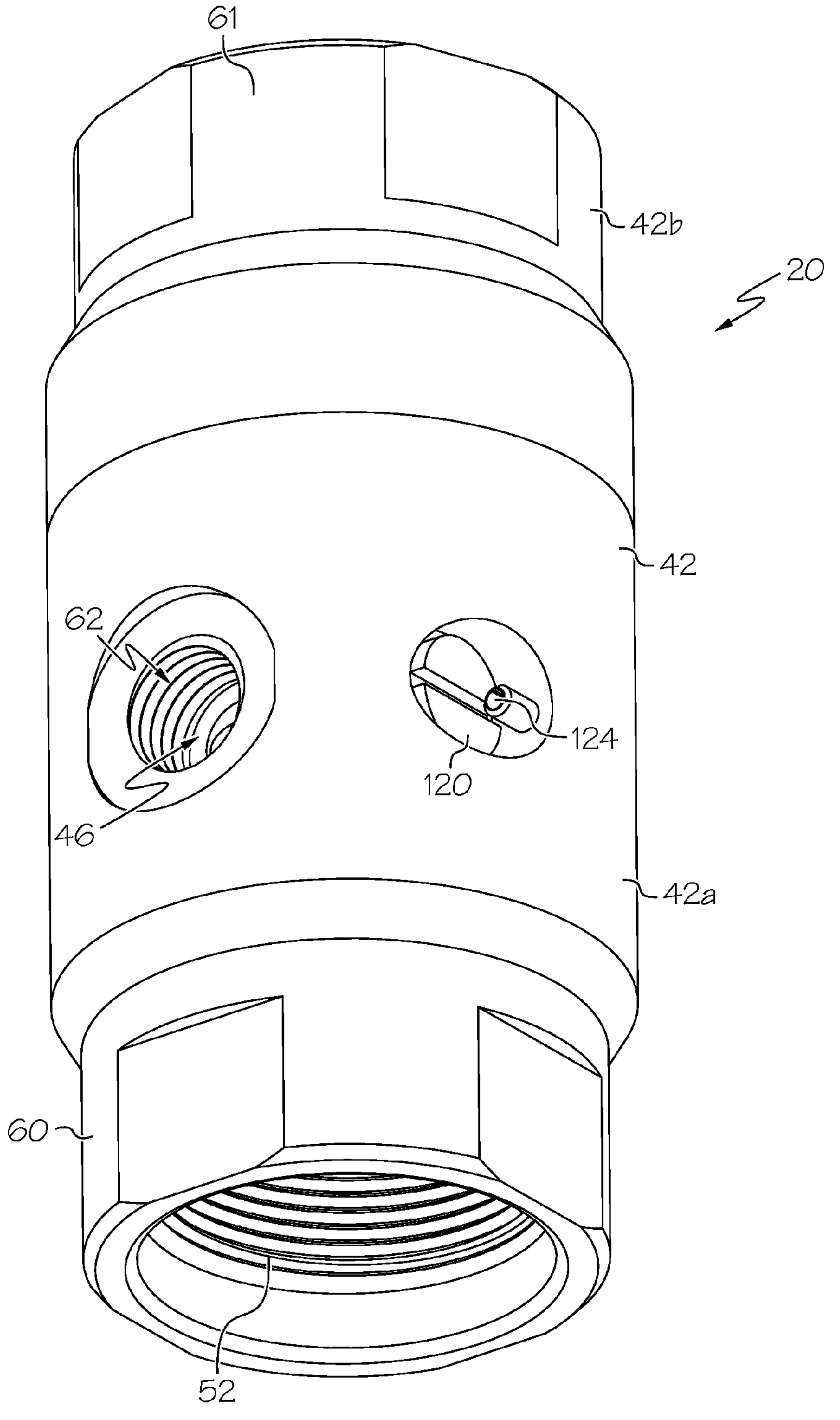
FIG. 6 is a perspective view of the vapor control valve of FIG. 2.

As best shown in FIG. 5, a threaded fastener 120 or the like in the form of a vapor recovery adjustment screw can be received in the valve body 42 and intersect the portion of the vapor flow path 46 upstream of the vapor control valve 96. The adjustment screw 120 has an opening 122 formed therethrough such that the adjustment screw 120 can be rotated to adjust the flow of vapor through the vapor flow path 46.

In particular, if the opening 122 is generally aligned with the vapor flow path 46, as shown in FIG. 5, full flow is allowed therethrough. Rotation of the adjustment screw 122 from the full open position causes misalignment of the 122 opening and the vapor flow path 46 to provide the desired vapor recovery characteristics to the vapor recovery valve 20. A pin 124 may be positioned adjacent to the adjustment screw 120 to retain the adjustment screw 120 in place. However, it should be understood that the adjustment screw 120/adjustment feature described above is optional and need not be utilized. In addition, other methods and mechanisms for adjusting the characteristics of the vapor recovery valve 20 may be utilized. For example, in some instances it may be desirable to provide an adjustable seat body 62 in order to provide added adjustability and fine tuning of the proportionality of the vapor control valve 96. In this case the seat body 62 may be axially adjustable, which in turn adjusts the axial position of the seat 100.

Thus in the illustrated embodiment the valve 20 is completely mechanical and controls vapor recovery due to forces created by the flow of fluid. In this case the valve 20 is relatively robust and does not require any electronic controls. When using vapor recovery valves which incorporate electronic controls, such valves must be electronically connected to the associated dispenser, which requires complex connections and can require modification of the dispenser which can void any warranties and/or approvals/certifications of the dispenser. Thus use of the valve 20 disclosed herein avoids such issues.

Returning to FIG. 1, as noted above, a plurality of dispensers 12 can be coupled to a single suction source 32. The suction source 32 can be configured to provide a generally constant vacuum output regardless of how many dispensers 12 are being operated (up to a practical maximum). There may be a slight decay in suction force for each additional dispenser 12, but the decay may be relatively small. For example, the suction source 32/dispenser system 10 may be configured such that a plurality of dispensers 12 may be simultaneously operated to dispense fuel and recover vapors and the suction source 32 provides a generally constant vacuum output whether one dispenser 12 is being used or multiple dispensers 12. For example, in one embodiment, the suction source 32 provides a constant suction output such that a suction force (in standard cubic feet per minute, in one case) varies by no more than about 1%, or about 5%, or about 10%, when one dispenser 12 is being used to dispense fuel and capture vapors compared to when two, or four, or even twenty-three dispensers are being utilized.

Figure 13:
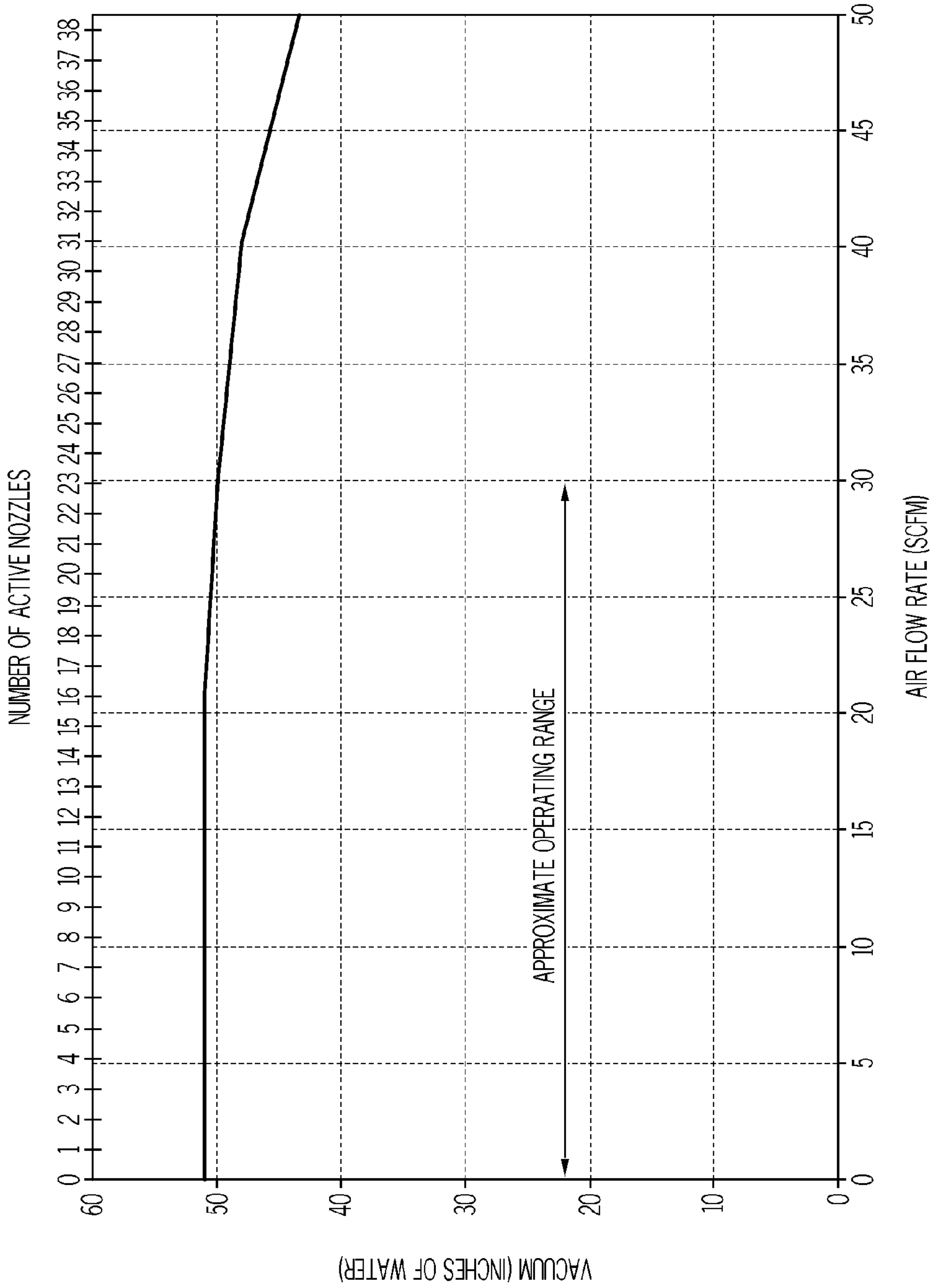
FIG. 13 is a performance graph of a vapor recovery pump.

FIG. 13 is a graph showing one particular embodiment of the relationship between the suction force and number of dispensers 12 being operated. It can be seen that the graph is relatively flat, showing the relative constant output of the suction source 32. However, it should be understood that the suction source 32 can have any of a wide variety of output characteristics based upon the number of dispensers 12 being utilized, and FIG. 13 is illustrative of only one particular embodiment. By way of example only, such a suction source 32 can be a DR 404, EN 404, CP 404, or any of the 404 series of pumps sold by Ametek Rotron Industrial Products of Saugerties, N.Y.

In such a system, wherein the suction source 32 provides a generally constant vacuum regardless of the number of dispensers 12 being operated, the system 10 may not need any vacuum regulators. In particular, in systems in which the output of the vacuum source varies significantly with respect to the number of dispensers 12 utilized, a vacuum regulator may be required to reduce the amount of applied vacuum when only one or a few dispensers 12 are being utilized. In contrast, when a generally constant suction source 32 is provided, a regulator is not required, thereby saving costs and increasing the simplicity of design, and reducing need for repairs, maintenance and the like.

It should also be noted that if, as previously described, the system 10 utilizes multiple vacuum pumps 32 (i.e. one for each dispenser 12 or hose point for each valve 20), the valve head 106 could be reshaped to accommodate the performance of the vapor recovery pump 32. The valve head 106 can also be shaped as desired to accommodate the various decay performance of the associated pump 32. When a single/centralized vacuum pump 32 is utilized, the generally flat performance curve is advantageous for multiple simultaneous fueling events. If each valve 20 were used in conjunction with its own individual vacuum pump 32, the valve head 106 can be configured for the standard performance of that individual pump 32, which may not necessarily be a generally flat performance curve.

Having described the invention in detail and by reference to the various embodiments, it should be understood that modifications and variations thereof are possible without departing from the scope of the invention.

What is claimed is:

1. A system including a vapor recovery valve comprising:

a valve body having a fluid flow path and a vapor flow path, said fluid flow path and said vapor flow path being generally fluidly isolated from each other and coaxially arranged in at least part of said valve body;

a vapor control valve positioned in said vapor flow path and being movable between a first position wherein said vapor control valve at least partially impedes the flow of vapor therethrough and a second position wherein said vapor control valve does not impede or less impedes the flow of vapor therethrough compared to when said vapor control valve is in said first position; and an actuator magnetically coupled to said vapor control valve, said actuator being configured such that sufficient fluid flow through said fluid flow path in a first direction causes said actuator to move said vapor control valve from said first position to said second position in a second direction that is generally not the same as said first direction, wherein said actuator includes a diaphragm positioned in a chamber and dividing said chamber into a pair of cavities and wherein said vapor control valve is configured such that unequal pressure in said cavities caused by a flow of fluid through said fluid flow path causes said actuator to move which, in turn, causes said vapor control valve to move, and wherein one of said cavities is in direct fluid communication with at least part of said fluid flow path such that at least part of said fluid flow in said fluid flow path is directable into said one of said cavities to provide a pressure in said at least one of said fluid cavities generally equal to the stagnation pressure of said at least part of said fluid flow.

2. The system of claim 1 wherein said second direction is opposite said first direction.

3. The system of claim 1 wherein said actuator is configured such that sustained sufficient fluid flow through said fluid flow path causes said vapor control valve to be maintained in said second position.

4. The system of claim 1 wherein said vapor control valve is configured such that said vapor control valve resides in said first position, due to a force other than gravity, when no fluid flows through said fluid flow path.

5. The system of claim 1 wherein said vapor control valve is configured such that said vapor control valve resides in said first position, due to a spring force, when no fluid flows through said fluid flow path.

6. The system of claim 1 wherein said actuator is biased into a first position such that said actuator causes said vapor control valve to reside in said first position when no fluid flows through said fluid flow path.

7. The system of claim 1 wherein said vapor control valve includes a movable portion positioned in said vapor flow path, and wherein said movable portion is in contact with or positioned relatively close to a seat when said vapor control valve is in said first position, and wherein said movable portion is relatively spaced away from said seat when said vapor control valve is in said second position, and wherein movement of said actuator in said first direction causes movement of said movable portion in said second direction, thereby causing said vapor control valve to move from said first position to said second position.

8. The system of claim 1 wherein said actuator is fluidly isolated from said vapor control valve by a continuous seal structure positioned between said vapor control valve and said actuator.

9. The system of claim 1 wherein said first position is a closed position wherein said vapor control valve generally blocks the flow of vapor through said vapor flow path and wherein said second position is an open position wherein said vapor control valve generally does not block the flow of vapor therethrough.

10. The system of claim 1 wherein said actuator is movable from said first to said second position at least in part due to venturi forces created by a flow of fluid through said fluid flow path.

11. The system of claim 1 wherein the other one of said cavities is configured to be exposed to venturi forces created by the flow of fluid through said fluid flow path.

12. The system of claim 1 wherein at least one of the actuator and the vapor control valve is made of or includes permanently magnetized material, and wherein the other one of the actuator and the vapor control valve is made of or includes permanently magnetized material or magnetizable material.

13. The system of claim 1 wherein said vapor control valve is a proportional valve such that the extent of opening of said vapor control valve is related to the flow rate of fluid through the fluid flow path.

14. The system of claim 1 wherein the system further comprises a nozzle configured to dispense fluid flowing through said fluid flow path and configured to capture vapors displaced by said dispensed fluid, the system further including a generally flexible hose fluidly coupled to said nozzle and to said vapor recovery valve, said nozzle being coupled to a first end of said hose and said vapor recovery valve being coupled to an opposite end of said hose.

15. The system of claim 14 wherein said nozzle, said hose, and said vapor recovery valve together form a dispenser, and wherein the system includes a plurality of dispensers, the vapor flow path of each dispenser being coupled to a single vacuum pump.

16. The system of claim 15 wherein said vacuum pump is configured to provide a generally constant suction output when one dispenser is being utilized to dispense fluid and capture vapors compared to when four dispensers are being utilized to dispense fluid and capture vapors.

17. A vapor recovery valve comprising:

a valve body having a fluid flow path and a vapor flow path, said fluid flow path and said vapor flow path being generally fluidly isolated from each other and coaxially arranged in at least part of said valve body;

a vapor control valve positioned in said vapor flow path, said vapor control valve being movable between a first state wherein said vapor control valve at least partially impedes the flow of vapor therethrough and a second state wherein said vapor control valve does not impede or less impedes the flow of vapor therethrough compared to when said vapor control valve is in said first state; and an actuator magnetically coupled to said vapor control valve, said actuator being configured such that sufficient fluid flowing through said fluid flow path causes said actuator to move said vapor control valve from said first state to said second state, said actuator being configured such that when a flow of said fluid flowing through said fluid flow path ceases or is sufficiently low, said actuator is moved due to a force other than gravity which in turn causes said vapor control valve to move from said second state to said first state, wherein said actuator includes a diaphragm positioned in a chamber and dividing said chamber into a pair of cavities and wherein said vapor control valve is configured such that unequal pressure in said cavities caused by a flow of fluid through said fluid flow path causes said actuator to move which, in turn, causes said vapor control valve to move, and wherein one of said cavities is maintained at a pressure generally equal to the stagnation pressure of fluid flowing through said fluid flow path.

18. A method for refueling and capturing vapors comprising:

providing a fuel dispenser including a vapor recovery valve having a fluid flow path and a vapor flow path, at least part of said vapor flow path being coaxial with at least part of said fluid flow path, said vapor recovery valve including a vapor control valve disposed in said vapor flow path and an actuator magnetically coupled to said vapor control valve, said actuator including a diaphragm positioned in a chamber and dividing said chamber into a pair of cavities; and allowing said dispenser to be operated such that fluid passes through said fluid flow path and captured vapors pass through said vapor flow path, wherein fluid flow through said fluid flow path in a first direction causes said actuator to move said vapor control valve from a first position to a second position in a second direction that is generally not the same as said first direction, wherein said vapor control valve at least partially impedes the flow of vapor therethrough in said first position and wherein said vapor control valve does not impede or less impedes the flow of vapor therethrough in said second position compared to when said vapor control valve is in said first position, wherein unequal pressure in said cavities caused by a flow of fluid through said fluid flow path causes said actuator to move which, in turn, causes said vapor control valve to move and wherein one of said cavities is maintained at a pressure generally equal to the stagnation pressure of fluid flowing through said fluid flow path.

19. The system of claim 1 wherein at least part of said vapor flow path is positioned radially inside at least part of said fluid flow path.

20. The system of claim 1 wherein said vapor flow path includes an exit portion through which vapor exiting said valve body flows, said exit portion being generally perpendicular to said fluid flow path at the same location in said valve body.

21. The system of claim 1 wherein said valve body includes a hose coupling connection at one end thereof configured to mechanically and fluidly couple the valve body to a coaxial fluid delivery hose or a coupling thereof and to fluidly couple the fluid flow path with a fluid path of the hose, the valve body further including annular seat body at said one end defining at least part of said vapor flow path and configured to slidably receive a nipple of the hose or coupling therein to fluidly couple said vapor flow path to a vapor path of said hose, wherein the seat body is spaced axially and radially inwardly relative to said hose coupling connection.

22. The system of claim 1 further including a vapor adjustment component coupled to or carried on said valve body and positioned downstream of the vapor control valve relative to the flow of vapor through the vapor flow path, wherein the vapor adjustment component is adjustable to adjust the flow of vapor through the vapor flow path.

23. The system of claim 7 wherein said movable portion includes a generally parabolic or generally bullet-shaped tip.

24. The system of claim 11 wherein said one of said cavities includes a flow path which directs fluid flow therein in a generally radially outward direction.

* * * * *